Feb. 5, 1929.
W. A. RIDDELL
PHOTOGRAPHIC SHUTTER
Filed Oct. 1, 1924
1,701,121
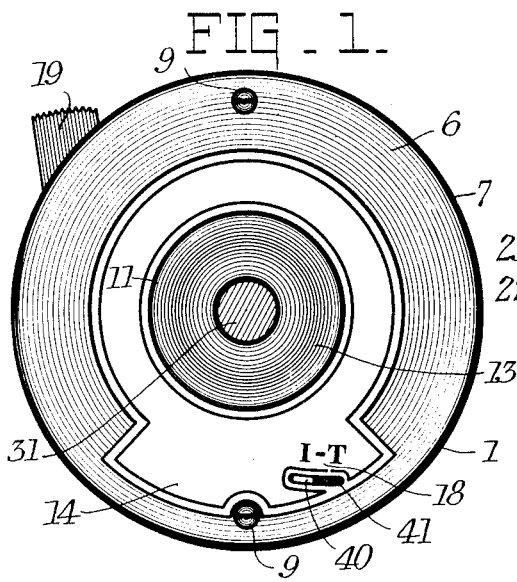
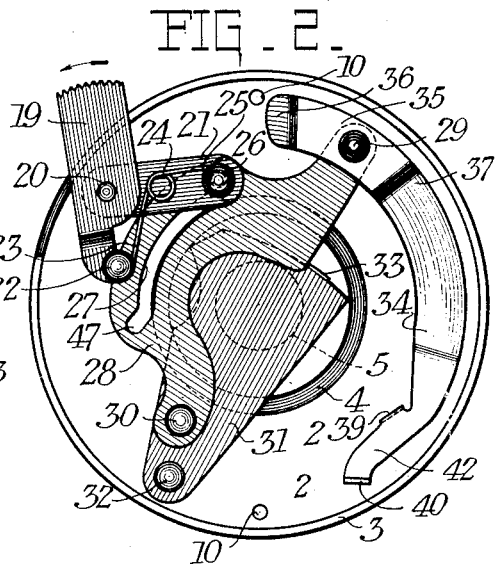
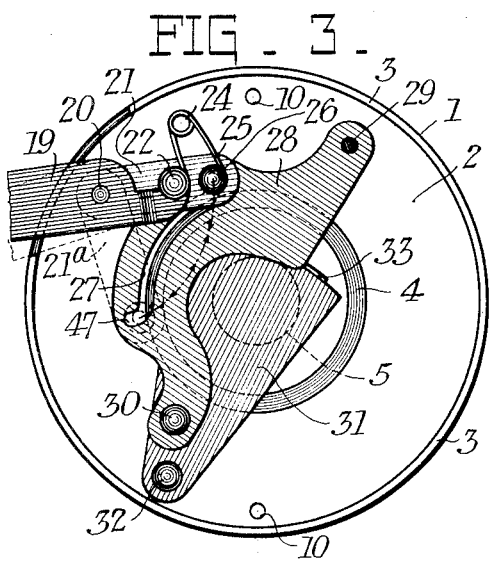
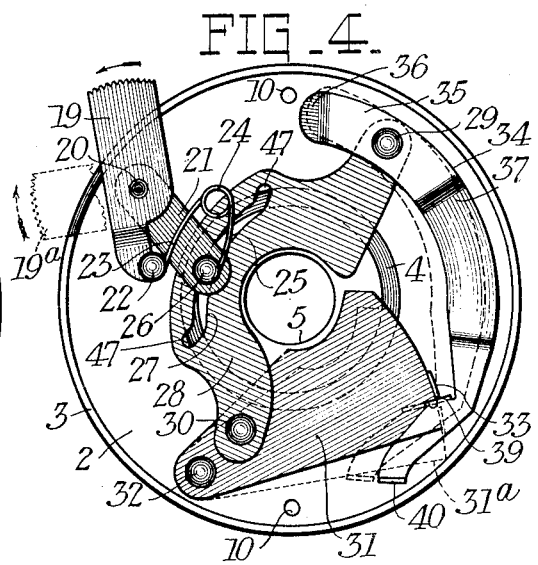
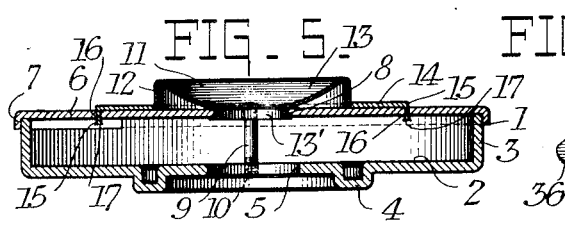
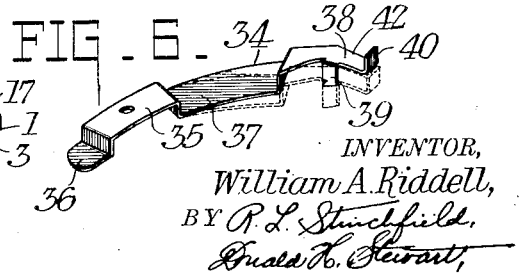
INVENTOR,
William A. Riddell,
BY
ATTORNEYS.

Patented Feb. 5, 1929.

1,701,121

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

Application filed October 1, 1924. Serial No. 741,036.

This invention relates to photography, and more particularly to photographic shutters. One object of my invention is to provide a simple and compact shutter in which the instantaneous exposure is of sufficient duration to obtain a fully exposed negative under average conditions. Another object is to provide a shutter in which the exposure lever may be moved first in one direction and then in the other for successive exposures, the cycle of operation of the blade and master member being the same regardless of the direction in which the exposure lever is moved. Another object is to provide a shutter of the class described having a simple time exposure lever. Another object is to provide a shutter in which the blade is latched against accidental movement through a jar or jolt, and still other objects will appear hereinafter in the following specification the novel features being pointed out in the claims at the end thereof.

In relatively simple shutters where no mechanical retarding mechanism such as air pumps, gear trains and the like are used it is difficult to get a shutter in which a sufficiently long exposure is obtained for snap shots with average light conditions and standard film. It has been found that an accurately timed exposure of between 1/25 and 1/30 of a second is the most desirable. Such an exposure may be obtained with a shutter constructed in accordance with this invention without expensive pumps, gears or the like.

It has also been found that in a great many shutters the jar, caused for instance in suddenly laying a camera down, occasionally causes the shutter leaf or leaves to oscillate slightly about their pivots thus admitting light rays which fog areas of the film causing a spoiled negative. My present invention is directed to overcoming this difficulty by means of a simple latch mechanism which functions automatically.

Coming now to the drawings, wherein like reference characters denote like parts throughout:

Fig. 1 is a plan view of a shutter constructed in accordance with and illustrating one embodiment of my invention;

Fig. 2 is a plan of the shutter shown in Fig. 1, the cover plate being removed, and showing the parts in position for an exposure;

Fig. 3 is a view similar to Fig. 2, with the exposure lever moved a part of the distance necessary to make an exposure, and with the time lever removed;

Fig. 4 is a view similar to Fig. 2, but with the shutter parts in an open position for time exposures;

Fig. 5 is a section through a shutter casing with the mechanism removed; and

Fig. 6 is a perspective view of the time lever.

In the present embodiment of my invention I provide a shutter casing 1 which is annular in form, comprising a base plate 2, outer flange 3 and inner flange 4 surrounding an opening 5 through which the exposure is made. A cover plate 6 forms a closure for casing 1 and consists of a flat plate with a flange 7 adapted to lie over the edge of flange 3. In plate 6 there is a central opening 8 admitting light to the shutter. Screws 9 entering tapped holes 10 hold the cover on the casing. There is a decorative front cup 11 having a flange 12, curved face 13 and an inner edge 13′ spun over the edge of the opening 8 so as to be retained on the shutter plate. I prefer to make this cup serve as a fixed diaphragm, the diameter of the edge 13′ being suitable for the lens equipment to be used with the shutter.

There is an index plate 14, preferably surrounding cup 11 and held to the cover plate 6 through lugs 15 passing through slots 16 and being deformed at 17. Plate 14 may conveniently be an etched plate bearing such data as the shutter name, number, maker or the like and carrying the exposure indicating data 18, here shown as I standing for instantaneous and T for time.

The exposure mechanism includes a shutter lever 19, pivoted upon stud 20 and movable between the full and dashed line positions 19 and 19$^a$ of Fig. 4. A link 21 is also pivoted upon stud 20. Lever 19 carries a pin 22 encircled by one end 23 of spring 24 the other end 25 encircling pin 26 of lever 21. Pin 26 constitutes a cam follower as it extends down through the cam slot 27 in master member 28 which is pivoted at 29 to the shutter casing. The opposite end of the master member is pivoted at 30 to the shutter blade 31. This blade is adapted to oscillate upon stud 32, and carries an upwardly extending lug 33.

For instantaneous exposures the exposure lever may be moved from full to dashed line position Fig. 4. The major portion of this movement tensions the spring, as best shown in Fig. 2, where it is in its position of rest, and in Fig. 3 where it has been tensioned and is about to be released. As will be readily seen this spring is tensioned and then the accumulated spring energy is suddenly released when pin 22 passes pin 26 in which it passes the "dead center." This takes place when lever 19 is moved slightly beyond the full line position Fig. 3. Link 21 is caused to swing from the full to the dashed line position and as it swings pin 26 through cam slot 27 causes the shutter to first open and then close. In its furthest extent of movement indicated in broken lines 31ª Fig. 4 the blade moves some distance past the aperture 5. For the next exposure lever 19 and link 21 move in opposite directions but the master member and the shutter blade always move through exactly the same path, giving a uniform and accurate exposure. With the cam slot shaped substantially as shown I have found approximately 1/3 of the total movement of the blade is consumed reaching a full open position, 1/3 of the movement leaves the aperture 5 fully open, and the last 1/3 completely closes the aperture.

For time exposures the time lever 34 pivoted on stud 29 is used. This lever, as shown in Fig. 6 is formed up at 35 for clearance, and is provided with flat portions 36 and 37 to each side. The end 38 is also formed up and carries the downwardly extending stop lug 39 and an upwardly extending setting lug 40. Lug 40 projects up through slot 41 and is used to move the lever to the indicating marks at 18. When formed lever 34 is bent as shown in full lines, but when assembled it is compressed by the shutter casing into dashed line position thus forming a spring tension causing parts 36 and 37 to frictionally engage the base plate 2, and part 42 to frictionally engage the shutter cover 6.

The function of lever 34 is to hold blade 31 from reaching its fully open position. When moved to the full line position (in this position lug 40 is opposite T) lug 39 is brought into the path of lug 33, consequently as blade 31 swings open it comes to a stop in the full line position (Fig. 4) and lever 19 must be removed in a reverse direction to return blade 31 to its normal closed position. By moving 40 to indicating mark I, lug 39 is moved to dashed line position Fig. 4 and lug 33 may swing past lug 39 for an instantaneous exposure.

In order to automatically latch the shutter blade shut (the position in which it forms a light tight cover for aperture 5) I curve the ends 47 of cam slot 27 so as to be substantially concentric with the path of pin 26—see Fig. 3. Obviously pin 26 may move a limited amount in slot 47 without moving the master member. This permits the pin 26 to gain a slight momentum before moving the master member, and causes the master member to shut the blade 31 before the shock of link 21 coming to rest against the end of slot 47 occurs, thus materially reducing shutter movement during exposure. In addition a slight shock vibrating lever 19 and link 21 cannot be transmitted through the master member to the shutter blade, and these last two mentioned parts are effectively latched against movement themselves since slots 47 are substantially at right angles to their paths of movement.

A brief review of the shutter movement is as follows: When a "snap-shot" exposure is desired, lug 40 is moved to I Fig. 1. Lever 19 is moved in one direction by a single steady pressure thus tensioning spring 24 and a continued pressure releases the spring causing link 21 to swing pin 26 through slot 27 thereby giving a back and forth movement to master member 28 and through it to shutter blade 31. For the next exposure lever 19 is pressed in an opposite direction causing a return movement of link 21. Regardless of the direction of movement of lever 19 and link 21, master member 28 and shutter leaf 31 move through the same cycle oscillating about their respective pivots. By moving lug 40 to T lug 39 comes into the path of lug 33 preventing 31 from moving to its possible extent of movement so that lever 19 must be moved in one direction to open the shutter and in a reverse direction to close it.

It should be understood that the embodiment shown in the drawing and above described is by way of illustration only, and that I contemplate as within the scope of my invention all such forms and embodiments as may come within the scope of the claims.

Having thus described my invention what I claim as new and desire to secure by Letters Patent is:

1. In a photographic shutter the combination with a shutter blade having a cycle of movement, a master member adapted to move the shutter blade through its cycle, and an exposure lever adapted to move back and forth to make successive exposures, connections between the exposure lever and the master member including a spring actuated link for moving the shutter blade through its cycle of movement for each back or forth movement of the exposure lever.

2. In a photographic shutter the combination with a shutter blade having a cycle of movement, of a master member adapted to move the blade through its cycle, said master member having a cam, an exposure lever movable in two directions for making an exposure, and connections between the exposure lever and the master member including a spring for acting on the cam for causing the shutter blade to oscillate through its cycle as the exposure lever is moved in either of its two directions.

3. In a photographic shutter the combination with a shutter blade having a cycle of movement, a master member for moving the blade, a swinging link adapted to be moved back or forth by a back or forth movement of an exposure lever, a cam and cam follower connection between the swinging link and master member, the cam being shaped to move the master member a like degree each time the exposure lever is moved back or forth, whereby the shutter blade will be caused to move through its cycle making an exposure.

4. In a photographic shutter the combination with a shutter blade having the same cycle of movement at each exposure, of an operating element adapted to be moved between two positions of rest, operable connections between the shutter blade and said element including a latching device to normally retain the shutter blade against accidental operation, said operable connections causing the blade to move through its cycle each time the element is moved from one position to the other.

5. In a photographic shutter the combination with a blade adapted to move through a similar cycle at each exposure, of a blade actuating mechanism including a cam carrying member and a cam follower adapted to be power driven first in one direction and then in the other, the shape of the cam being such that the follower may move freely a short distance without moving the cam carrying member, after which further movement will move the cam carrying member and thereby causing the shutter blade to move through its cycle of operation.

6. In a photographic shutter, the combination with a blade adapted to move about a pivot to uncover and cover an aperture, of a blade moving mechanism including a cam and cam follower, the cam follower being adapted to move between two positions of rest about a pivot, a portion of the cam being concentric to the path of the cam follower permitting the latter to move without moving the cam carrying member, and another portion of the cam being disposed out of concentric alignment with the path of the cam follower permitting the cam follower to move the cam carrying member and with it the shutter blade.

7. In a photographic shutter the combination with a shutter blade adapted to uncover and cover an exposure aperture, of operating mechanism therefor including an exposure lever, and an operating link pivoted on the same stud, a spring connecting these two parts and positioned so that when the exposure lever is moved in one direction the spring will be tensioned and then released so as to drive the link in the opposite direction, and mechanism operated upon by the link for moving the shutter blade to uncover and cover the exposure aperture at each operation of the exposure lever.

8. In a photographic shutter the combination with a shutter blade having the same cycle of movement for successive exposures of operating mechanism therefor including a pivoted exposure lever which may be moved in two directions, and a pivoted link connected by a spring, said parts being arranged so that the spring is first tensioned and then released by a single movement of the exposure lever in either direction, the releasing of the spring permitting the link to be driven in a direction opposite to that in which the exposure lever was moved, and connections between the link and the shutter blade adapted to drive the latter through its cycle of movement each time the exposure lever is moved.

9. In a photographic shutter the combination with a shutter blade adapted to uncover and cover an exposure aperture, of an operating element therefor, mechanism connecting the operating element and the shutter blade, and a time lever movably mounted on the shutter for cooperating with the mechanism forming a stop by which the shutter blade may be held while the exposure aperture is uncovered, the time lever including a spring arm held under compression so as to be frictionally retained in its set position.

10. In a photographic shutter the combination with a shutter blade adapted to uncover and cover an exposure aperture, of an operating element therefor, mechanism connecting the operating element and the shutter blade, a two walled shutter casing for containing the mechanism, a time lever also mounted in the casing and being movable to and from an operative position in which it cooperates with the mechanism and causes a time exposure, said time lever being constructed of spring metal having frictional engagement with the two walls of the shutter casing so as to be frictionally held in a set position.

11. In a photographic shutter, the combination with a shutter blade adapted to cover and uncover an exposure aperture, of operating mechanism therefor including an exposure lever, a pin supporting the exposure lever, an operating link pivoted on the pin, an end of the exposure lever and an end of the link being differentially spaced from the pin, and a spring connecting these parts and adapted to hold them normally spaced apart, said spring furnishing power to drive the shutter blade.

12. In a photographic shutter, the combination with a shutter blade adapted to cover and uncover an exposure aperture, of operating mechanism therefor including an exposure lever, an operating link, a common stud upon which the exposure lever and the operating link are pivoted, a spring normally separating parts of the operating link and the exposure lever, and connections between the operating link and the shutter blade for moving the latter by the former when the exposure lever is moved in one direction.

13. In a photographic shutter, the combination with a shutter blade having the same cycle of movement at each exposure, of an operating element adapted to be moved between two positions of rest, a spring anchored to the operating element, a movable member carrying the other end of the spring by which the spring may be made to drive the operating element alternately between its two positions of rest, driving said operating element in one direction when the movable member is moved in one direction, and connections between said operating element and said shutter blade for causing the latter to move through its cycle at each actuation of the movable member.

14. In a photographic shutter, the combination with a shutter blade having the same cycle of movement at each exposure, of an operating element adapted to be moved between two positions of rest, a spring anchored to the operating element, a movable member carrying the other end of the spring by which the spring may be made to drive the operating element alternately between its two positions of rest, a trigger extending outside the shutter casing for actuating the movable member, and connections between said operating element and said shutter blade for causing the blade to move through its cycle when the movable member is moved by the trigger.

15. In a photographic shutter the combination with a shutter blade having the same cycle of movement for each exposure, of an operating element adapted to move in two directions, a trigger adapted to move in two directions, a spring connecting the trigger and operating element for transmitting movement from one to the other, connections between the operating element and the shutter blade through which the latter may be moved through its cycle of movement at each actuation of the trigger in one direction.

16. In a photographic shutter, the combination with a blade adapted to move through the same cycle for each exposure, a master member having a cam, connections between the master member and the shutter blade, a cam follower mounted to move alternatively between two positions of rest, a pivoted trigger, and spring connections between the trigger and the cam follower through which the latter is moved in one direction at a time whereby the shutter blade may move through its cycle at each actuation.

Signed at Rochester, New York this 27th day of September, 1924.

WILLIAM A. RIDDELL.